US009229757B2

(12) United States Patent
Ben-Yehuda et al.

(10) Patent No.: US 9,229,757 B2
(45) Date of Patent: Jan. 5, 2016

(54) OPTIMIZING A FILE SYSTEM INTERFACE IN A VIRTUALIZED COMPUTING ENVIRONMENT

(75) Inventors: Shmuel Ben-Yehuda, Haifa (IL); Eran Borovik, Haifa (IL); Eran Rom, Tel Aviv (IL); Avishay Traeger, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1450 days.

(21) Appl. No.: 12/838,508

(22) Filed: Jul. 19, 2010

(65) Prior Publication Data

US 2012/0017030 A1    Jan. 19, 2012

(51) Int. Cl.
*G06F 9/455* (2006.01)
*G06F 12/08* (2006.01)

(52) U.S. Cl.
CPC ........ *G06F 9/45558* (2013.01); *G06F 12/0802* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,863,117 B2 * | 10/2014 | Ben-Yehuda et al. | 718/1 |
| 2003/0097608 A1 * | 5/2003 | Rodeheffer et al. | 714/7 |
| 2005/0114338 A1 * | 5/2005 | Borthakur et al. | 707/9 |
| 2007/0271428 A1 * | 11/2007 | Atluri | 711/162 |
| 2008/0162864 A1 | 7/2008 | Sugumar et al. | |
| 2009/0165117 A1 * | 6/2009 | Brutch et al. | 726/14 |
| 2009/0240904 A1 | 9/2009 | Austruy et al. | |
| 2009/0307461 A1 | 12/2009 | Nevarez et al. | |
| 2009/0327632 A1 | 12/2009 | Glaizel et al. | |
| 2010/0011178 A1 | 1/2010 | Feathergill | |
| 2010/0042796 A1 | 2/2010 | Vasilevsky et al. | |
| 2010/0228903 A1 * | 9/2010 | Chandrasekaran et al. | 718/1 |
| 2011/0265083 A1 * | 10/2011 | Davis | 718/1 |
| 2011/0271034 A1 * | 11/2011 | Scouller et al. | 711/103 |
| 2012/0017209 A1 * | 1/2012 | Ben-Yehuda et al. | 718/1 |
| 2012/0072652 A1 * | 3/2012 | Celis et al. | 711/103 |
| 2013/0007729 A1 * | 1/2013 | Sirotkin | 718/1 |
| 2014/0310281 A1 * | 10/2014 | Somekh et al. | 707/737 |
| 2014/0372691 A1 * | 12/2014 | Jorgensen | 711/105 |

FOREIGN PATENT DOCUMENTS

WO     2009145764     12/2009

OTHER PUBLICATIONS

B. Pfaff, T. Garfinkel, M. Rosenblum, "Virtualization Aware File Systems: Getting Beyond the Limitations of Virtual Disks" NSDI, 2006.

(Continued)

*Primary Examiner* — Daniel Tsui
(74) *Attorney, Agent, or Firm* — David Zwick; Eyal Gilboa

(57) ABSTRACT

Systems and methods for optimizing write operations to a storage device in a virtualized computing environment comprise monitoring write operations issued by an application running on a virtual machine's (VM) operating system, wherein the VM is hosted by a hypervisor providing access to a storage device in a virtualized computing environment; and causing a virtual file system (VFS) supported by the operating system to call on a first para-virtualized file system (PVFS FE) supported by the operating system to execute a write operation, in response to determining that the write operation is to write data to the storage device, wherein data that is to be written to the storage device is first written to a VM memory area allocated to the VM and accessible to the hypervisor hosting the VM.

9 Claims, 7 Drawing Sheets

(56) References Cited

OTHER PUBLICATIONS

S. Shepler et al., "Network File System (NFS) version 4 Protocol", Network Appliance, Inc. Apr. 2003. UML: http://www.ietf.org/rfc/rfc3530.txt.

Rosenblum, Mendel and Ousterhout, John K, "The LFS Storage Manager", USENIX Summer Technical Conference, 1990.

Sorin Faibish et al., "Storage Virtualization Using a Block-Device File System". URL :http://portal.acm.org/citation.cfm?id=1341312.1341340.

Ming Zhao et al., "Distributed File System Virtualization Techniques Supporting On-Demand Virtual Machine Environments for Grid Computing", Cluster Computing 9, 45-56, 2006. 2006 Springer Science + Business Media, Inc. Manufactured in The United States. URL:http://www.acis.ufl.edu/~ming/research/cc06.pdf.

\* cited by examiner

OPTIMIZING A FILE SYSTEM INTERFACE IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to a virtualized file system interface and, more particularly, to a system and method for optimizing data operations over such interface.

BACKGROUND

A virtual machine (VM) is a software implementation of a machine (i.e., a computer) that executes programs like a physical machine would. Generally, access to resources in virtualized environments is associated with a high level of overhead because the VM typically cannot directly communicate with a virtualized resource. A hypervisor that hosts the VM typically has the burden of emulating the needed interface or driver on behalf of the VM. In other words, the hypervisor presents the VM with a virtual platform and monitors the execution of the VM and how the VM accesses the available hardware resources.

For example, for a VM to read or write data to a virtualized storage device, control of the read or write operations will have to be transferred between the VM and the hypervisor. The hypervisor may use any type of storage interface for storing the VM's data, including local file system, network file system, network block device, etc. In a purely emulated case, the VM has no knowledge that the provided interface (i.e., the block device) is not a real physical device, because the hypervisor emulates the interface in software. A high overhead is associated with such emulation. The operational overhead is even more costly, if there is a need for transferring control intermittently between the VM and the hypervisor during I/O operations.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance to one embodiment, a method for optimizing write operations to a storage device in a virtualized computing environment comprises monitoring write operations issued by an application running on a virtual machine's (VM) operating system, wherein the VM is hosted by a hypervisor providing access to a storage device in a virtualized computing environment; and causing a virtual file system (VFS) supported by the operating system to call on a first para-virtualized file system (PVFS FE) supported by the operating system to execute a write operation, in response to determining that the write operation is to write data to the storage device, wherein data that is to be written to the storage device is first written to a VM memory area allocated to the VM and accessible to the hypervisor hosting the VM; wherein a second para-virtualized file system (PVFS BE) supported in the hypervisor asynchronously scans the VM memory to determine if any data that has been stored in the VM memory is to be written to the storage device, and wherein the PVFS BE writes the data that is to be written to the storage device from VM memory to the storage device.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
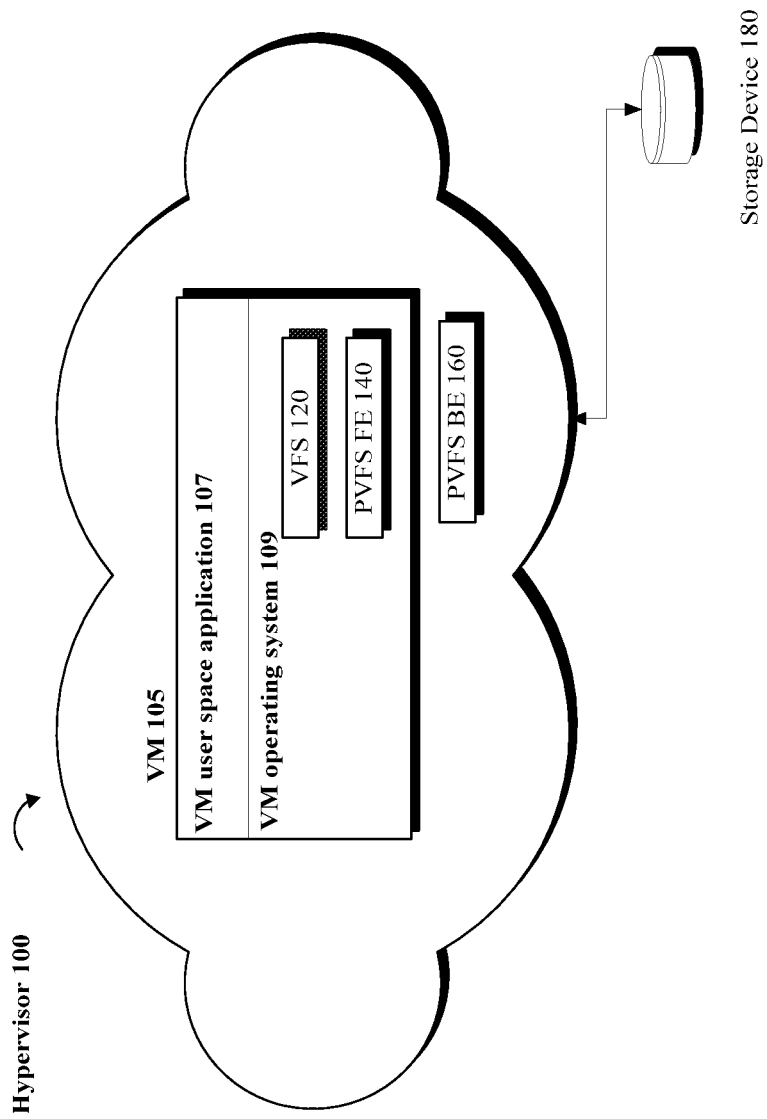
FIGS. 1, 2A and 3A illustrate exemplary computing environments in accordance with one or more embodiments, wherein a VM hosted by a hypervisor is implemented to read from or write to a storage device accessible via the hypervisor.

Referring to FIG. 1, in accordance with one embodiment, a VM 105 may be hosted by a hypervisor 100, in a computing environment. The hypervisor 100 is implemented to emulate an interface (e.g., a block device) to allow the VM 105 communicate with a resource (e.g., storage device 180) that is accessible via the hypervisor 100. Depending on implementation, the overhead associated with the emulation and the need for transfer of control between VM 105 and a hypervisor 100 may be reduced by way of using a para-virtualized block driver in place of a standard driver which requires device emulation.

When the VM 105 uses a para-virtualized component (e.g., a block driver) the performance may be optimized by batching multiple I/O requests and using shared memory to avoid multiple data copies, as provided in further detail below. As shown in FIG. 1, a computer-implemented application such as a software code (e.g., user space application 107) may be running on a VM operating system 109 executed on VM 105. The VM operating system 109 may support a virtual file system (VFS) 120 and a first para-virtualized file system (PVFS FE) 140. The hypervisor 100 may support a second para-virtualized file system (PVFS BE) 160 capable of communicating with PVFS FE 140.

In one implementation, the PVFS FE 140 and the PVFS BE 160 are utilized to allow VM 105 to perform read/write operations on storage device 180 such that the write operations are performed by way of asynchronous communication between VM 105 and hypervisor 100 and the read operations are performed by way of file system level requests. It is noteworthy that the VM's 105 memory (not shown) is desirably fully accessible from the hypervisor 100. In accordance with one embodiment, a para-virtualized file system is implemented differently from a typical file system in that the para-virtualized file system is aware that it is running in VM 105 and not directly on hardware, and uses the virtual machine's specific properties to provide additional functionality. For example, here the PVFS FE 140 and PVFS BE 160 utilize shared memory to improve performance A typical file system (e.g., NTFS, ext3) running in VM 105 is agnostic to the fact that it is running in a virtual environment.

For example, device assignment option may be utilized to allow the VM 105 access storage device 180. A device assignment grants the VM 105, desirably, full access to storage device 180 so that the VM 105 may send I/O requests directly to storage device 180. Interrupts may be routed through the hypervisor 100. Device assignment option may not be desirable if storage device 180 is intended for sharing among several VMs and the hypervisor and may not support VM migration due to the VM's direct interface assignment to a particular device, instead of the hypervisor provided interface. It is noteworthy that in the following, the term data may refer to either content data or metadata corresponding to such data, or both. In this context, metadata may be data that provides additional information about the content data, such as directory listings, modes, or indirect blocks, without limitation.

Figure 2A:
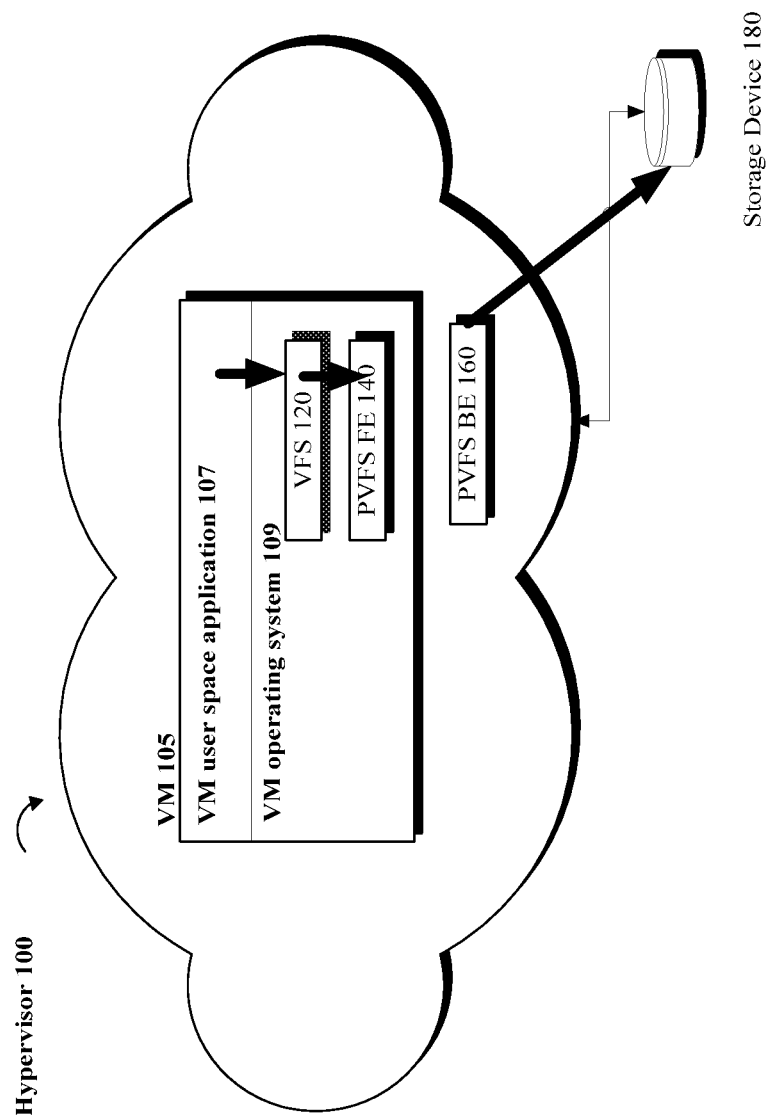
Figure 2B:
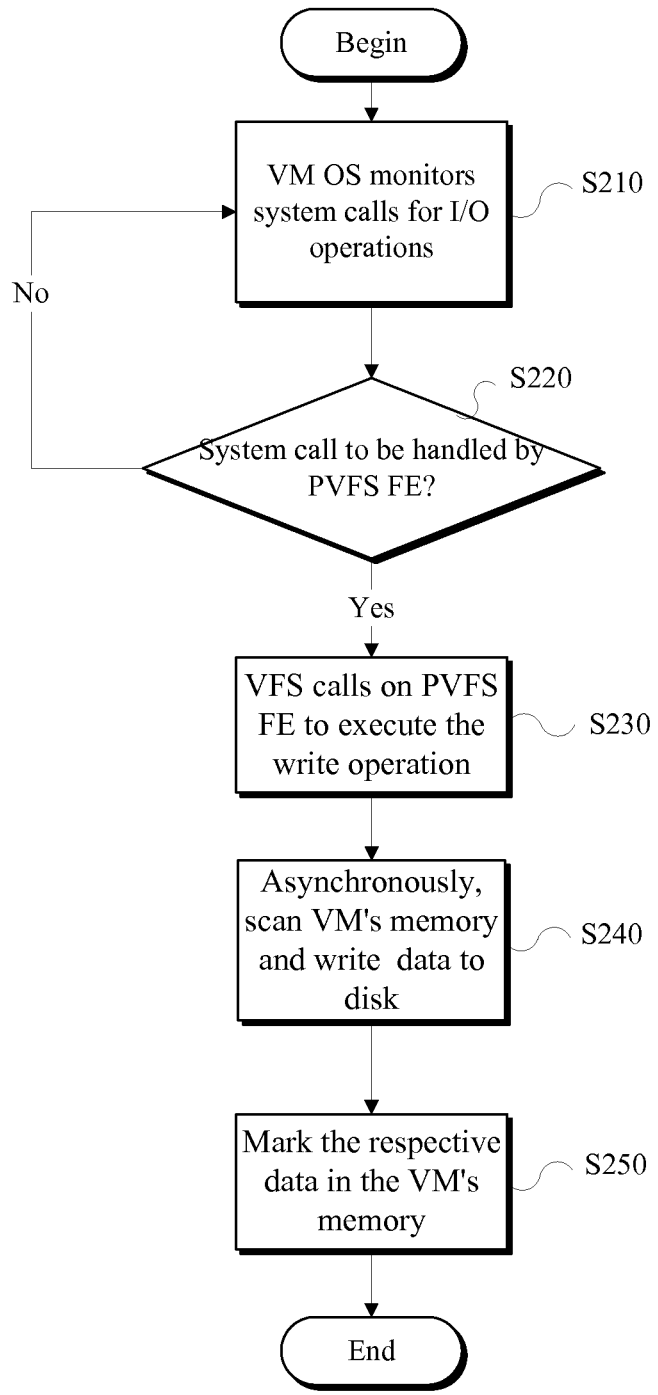
FIGS. 2B and 3B are exemplary flow diagrams of methods for respectively reading or writing to the storage device illustrated FIGS. 1, 2A and 3A, in accordance with one embodiment.

Referring to FIGS. 2A and 2B, in one embodiment, VM user space application 107 may issue a system call. The VM's operating system 109 monitors the system calls for I/O operations (S210) and calls on the VFS 120 to determine whether the system call is to be handled by the PVFS FE (S220). If so, the VFS 120 calls on PVFS FE 140 to handle the system call, which may be for executing a write operation, for example (S230). It is noteworthy that a write operation may be the result of a metadata update system call, or any other operation that results in updating data or metadata on storage device 180. The data that is to be updated or written may be stored in the VM's 105 memory which is accessible from the hypervisor 100.

In accordance with one embodiment, since the PVFS FE 140 resides in the VM's operating environment, PVFS FE 140 shares the VM's memory to temporarily cache the data that is to be written to storage device 180. On the other hand, since PVFS BE 160 resides in the hypervisor's 100 operating environment, and the hypervisor 100 has access to VM's 105 memory, then PVFS BE 160 also has access to VM's 105 memory.

In one implementation, the PVFS BE 160 asynchronously scans the VM's 105 memory to determine if any data or metadata that has been stored in the memory needs to be written to storage device 180, and, if so, PVFS BE 160 writes that data to storage device 180 (S240). The PVFS BE 160 then marks the respective data in the VM's 105 memory to indicate that said data has been written to storage device 180 (250). The asynchronous scanning may be performed based on the passage of a time interval from the last scan or determining that a certain amount of data has been written to VM's 105 memory or determining that a certain number of writes has been performed to the VM's 105 memory by the PVFS FE 140 after the last scan.

In certain embodiments, more advanced algorithms for predicting the VM's behavior may be utilized to determine the nature and frequency of VM's memory scans. For example, PVFS BE 160 or other scanning utility may monitor and model PVFS FE's 140 write patterns to predict when VM memory should be scanned. Or recent write history to the storage device 180 may be used to determine how often the VM's memory should be scanned.

Figure 3A:
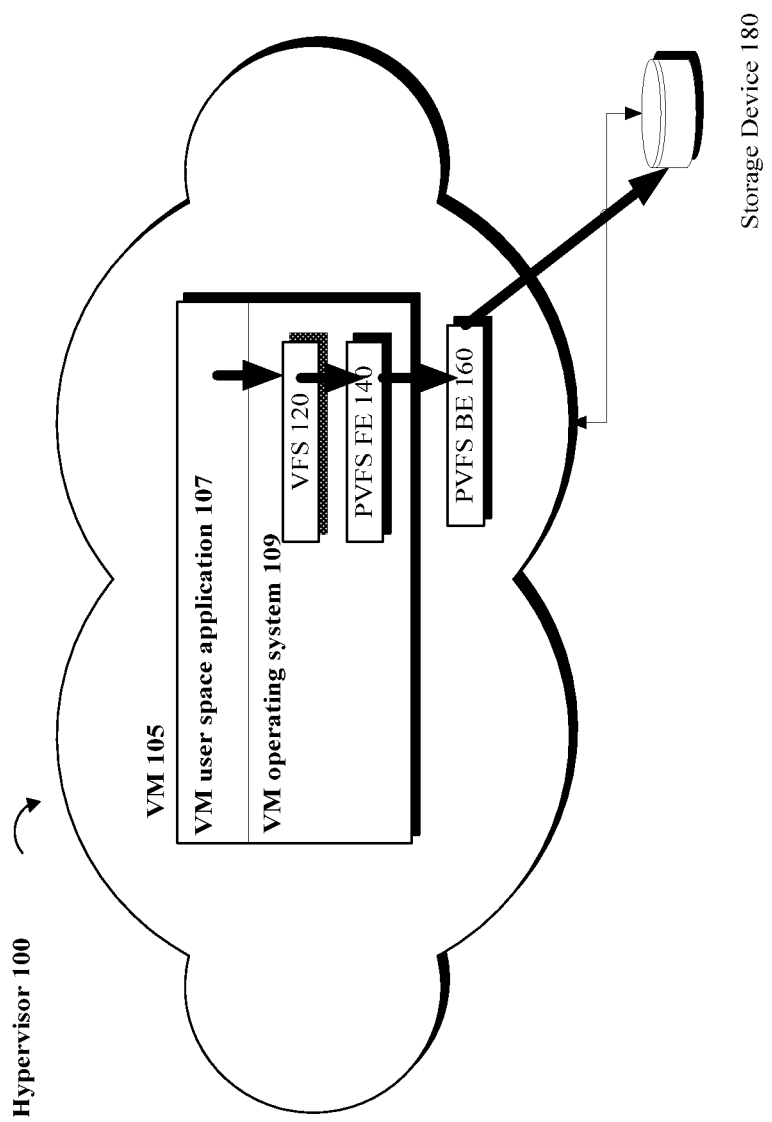
Figure 3B:
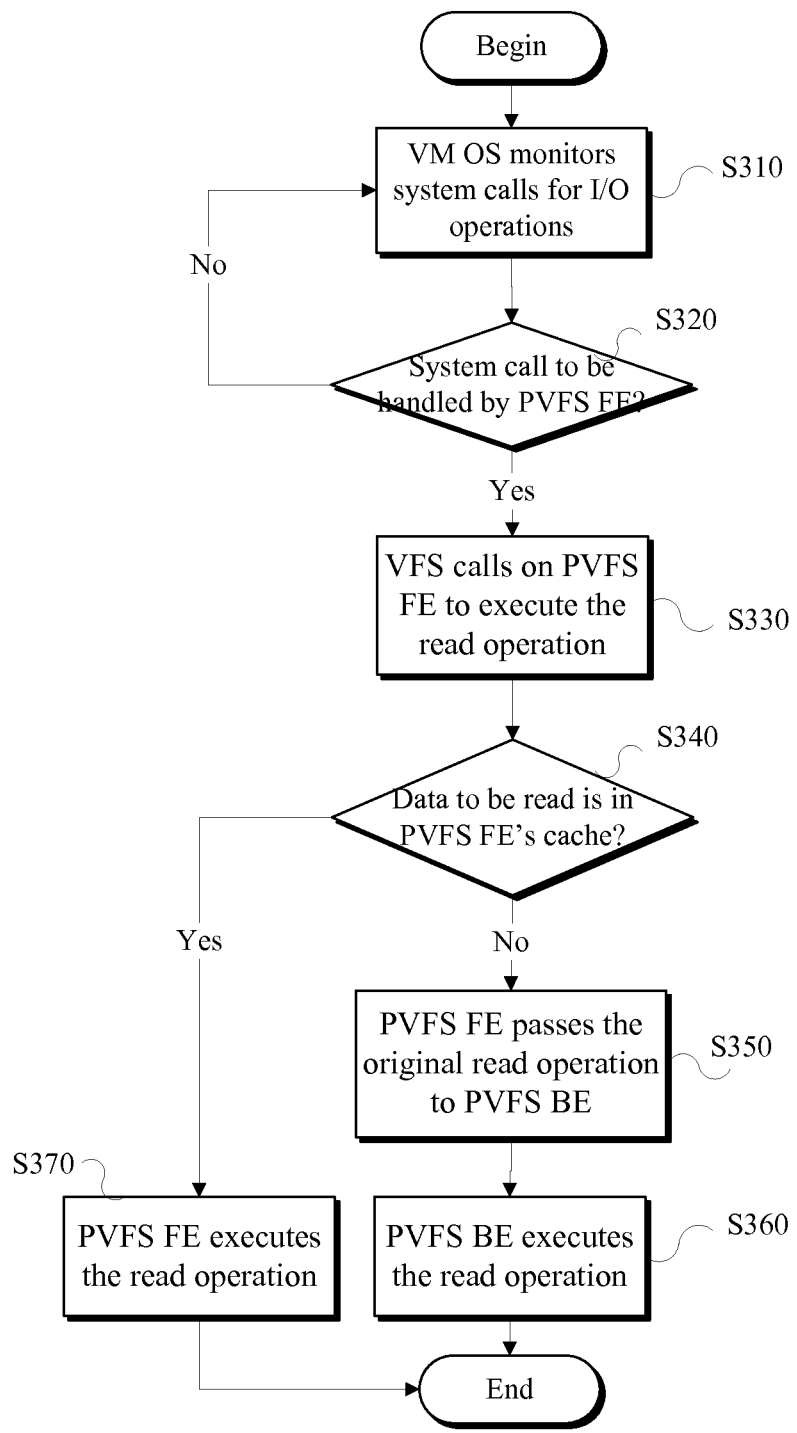

Referring to FIGS. 3A and 3B, in one embodiment, user space application in VM 105 may issue a read system call to read data from storage device 180. The VM's 105 operating system monitors the system calls (S310) and calls on the VFS 120 to determine whether a read operation should be handled by the PVFS FE 140 (S320). If so, then the operating system causes the VFS 120 to call on PVFS FE 140 to execute the read operation (S330). It is noteworthy that a read operation may be the result of a metadata read system call, or any other operation that results in reading data or metadata on storage device 180.

If the data to be read exists in PVFS FE's 140 cache (S340), then PVFS FE 140 attempts to satisfy the read request from its cache and executes the read operation (S370). However, if a cache miss is encountered (e.g., if the target data or the corresponding metadata is not in PVFS FE's 140 cache), PVFS FE 140 passes the original read operation to PVFS BE 160 (S350). Desirably, PVFS BE 160 executes the read operation (S360), either entirely from PVFS BE's 160 cache or from the storage device 180, if the data or the corresponding metadata are not present in PVFS BE's 160 cache.

In accordance with one embodiment, the PVFS BE 160 returns the memory pages it used to satisfy the request to the PVFS FE 140 so that PVFS FE 140 can populate its cache, and so that PVFS FE 140 may return the requested data to the VFS 120. It is noteworthy that in certain implementations the returned memory pages include the target data or the corresponding metadata or both.

Accordingly, in one or more embodiments, the hypervisor 100 is configured to have access to at least a portion of the VM's 105 memory. To perform certain I/O operations or file system modifications such as creating a file or writing to a file, the VM 105 modifies its in-memory file system state. The in-memory file system state includes data and corresponding metadata. The metadata may define the file system structure or provide additional information about a directory or a file in the file system. The PVFS BE 160 desirably asynchronously monitors the VM's 105 in-memory file system state and performs the proper write operations to commit the VM's modifications to storage device 180.

As such, in case of a write operation, the interface between PVFS FE 140 and PVFS BE 160 is asynchronous implemented, so that the VM 105 won't have to request for hypervisor 100 to control the write operation on the VM's behalf by way of a fully emulated or para-virtualized I/O interface. The PVFS BE's 160 asynchronous monitoring of the VM's 105 memory may result in the more efficient use of CPU power in contrast to implementations that require synchronous monitoring. In some implementations, the monitoring may be limited to one pass every few seconds, for example.

To avoid several switches (i.e., control transfers) between hypervisor 100 and VM 105 during a data or meta-data read operation, a single file system level read operation is utilized to service several disk block read requests. A single file system level read operation is a high-level VFS call, which is generally similar to a system call (e.g., reading from a file, reading file metadata, listing directory contents, etc.). It is noteworthy that in certain implementations no differentiation is made between data and metadata reads. To avoid servicing several disk block requests to read metadata in order to find the target data, followed by several requests to read the target data itself, the PVFS FE 140 is implemented to send a file system level request to the PVFS BE 160.

The PVFS BE 160, in one embodiment, simulates the read operation to determine the storage device's 180 segments that the PVFS FE 140 will need in order to fulfill the PVFS BE 160 read request. The PVFS BE 160 may retrieve the necessary segments from its cache or from storage device 180, and then transfers the data segments to the VM 105 together, so that the PVFS FE 140 may satisfy the read request from its cache.

The above implementation reduces the number of intermittent control switches that may be needed between the VM 105 operating system and the hypervisor 100, if the data segments were to be cached individually. The elimination of multiple switches improves read performance. In certain exemplary embodiments (e.g., NFSv4), a network file system protocol's compound operations may be utilized to implement the above configuration where a lookup and read request may be transferred from a client to the server via a single remote procedure call (e.g., RPC). In one embodiment, the hypervisor 100 provides the VM 105 with the information VM 105 needs to populate its cache and execute the operation itself. Future VM 105 read operations may thus be satisfied from cache without a need for a control switch back to the hypervisor 100.

In certain embodiments, the above system may be implemented as a para-virtualized file system in a kernel based virtual machine (KVM) hypervisor. KVM includes a notification based protocol that supports a shared memory mechanism between a VM 105 and a hypervisor 100. For the hypervisor 100 to efficiently track writes that the VM 105 performs to memory, a para-virtualized file system may be implemented on a log-structured file system (e.g., LFS or NILFS). In such exemplary log-structured file systems, data and metadata writes are appended to a log.

LFS divides a storage device into segments, wherein one of the segments is active at any one time. Each segment has a header called a summary block. Each summary block contains a pointer to the next summary block, linking segments into a chain that LFS treats as a linear log. Due to the nature of the log which supports append-only data writes, for example, the hypervisor 100 may efficiently detect writes performed by VM 105. For example, if a file meta-data update is necessary, the PVFS FE 140 will append the operation to the log. PVFS BE 160 will then monitor the log for new appends instead of monitoring all data structures of PVFS FE 140 to detect updates.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
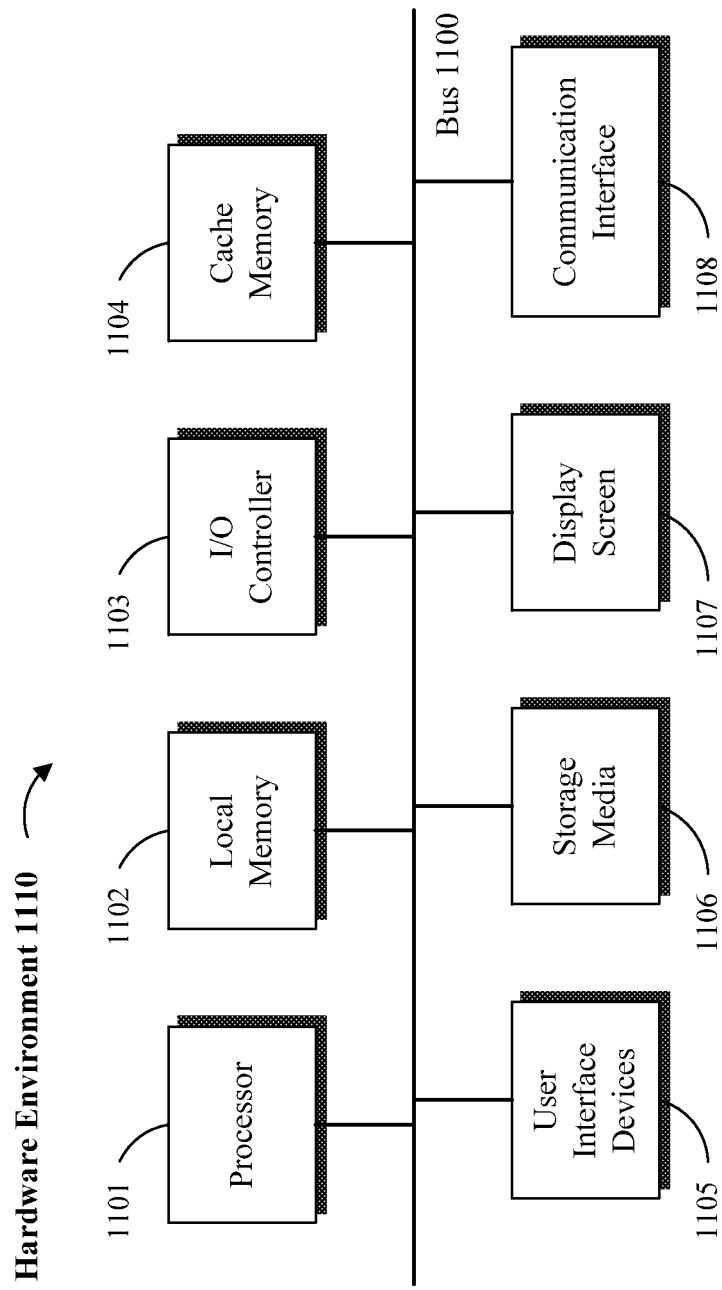
FIGS. 4A and 4B are block diagrams of hardware and software environments in which the disclosed systems and methods may operate, in accordance with one or more embodiments.
Figure 4B:
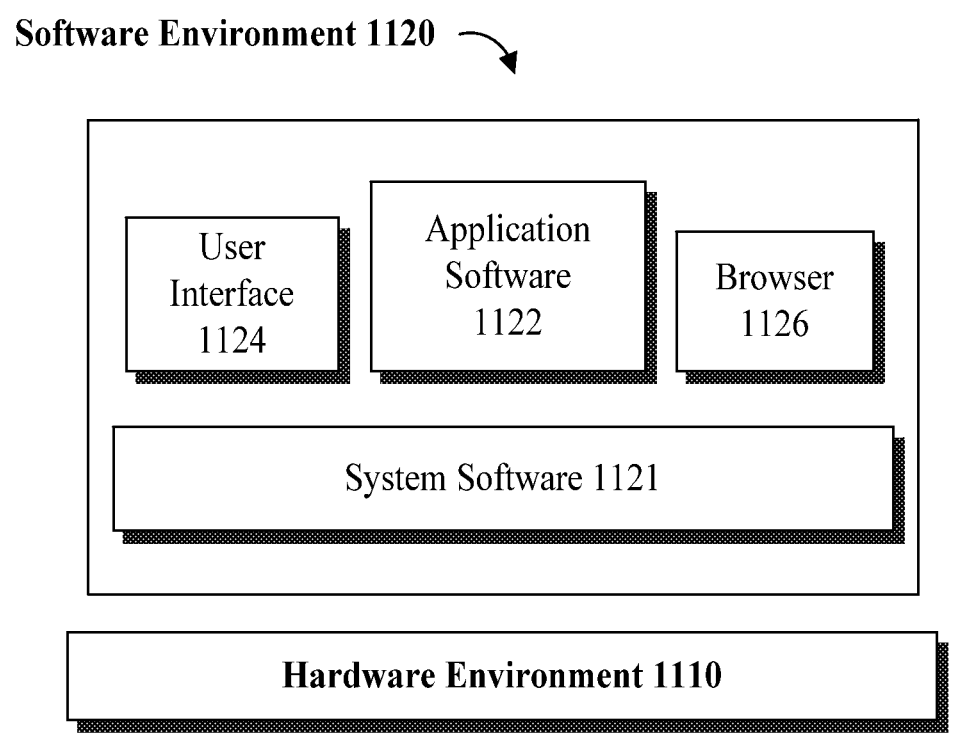

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for optimizing write operations to a storage device in a virtualized computing environment, the method comprising:
    monitoring write operations issued by an application running on a virtual machine's (VM) operating system, wherein the VM is hosted by a hypervisor providing access to a storage device in a virtualized computing environment; and
    causing a virtual file system (VFS) supported by the operating system to call on a first para-virtualized file system (PVFS FE) supported by the operating system to execute a write operation, in response to determining that the write operation is to write data to the storage device, wherein data that is to be written to the storage device is first written to a VM memory area allocated to the VM and accessible to the hypervisor hosting the VM;
    wherein a second para-virtualized file system (PVFS BE) supported in the hypervisor asynchronously scans the VM memory to determine if any data that has been stored in the VM memory is to be written to the storage device, wherein the asynchronous scanning is performed based on determining one or both of: that a certain amount of data has been written to the VM memory by the PVFS FE after a certain point in time; or that PVFS FE has written data to the VM memory a certain number of times after a certain point in time; and
    wherein the PVFS BE writes the data that is to be written to the storage device from VM memory to the storage device.

2. The method of claim 1, wherein the PVFS BE marks the data in VM memory that is written to the storage device to indicate that said data has been written to the storage device.

3. The method of claim 1, wherein the asynchronous scanning is performed in predetermined time intervals based on the expiration of a timing threshold.

4. A system for optimizing write operations to a storage device in a virtualized computing environment, the system comprising:
    a processor for monitoring write operations issued by an application running on a virtual machine's (VM) operating system, wherein the VM is hosted by a hypervisor providing access to a storage device in a virtualized computing environment; and
    the operating system causing a virtual file system (VFS) supported by the operating system to call on a first para-virtualized file system (PVFS FE) supported by the operating system to execute a write operation, in response to determining that the write operation is to write data to the storage device, wherein data that is to be written to the storage device is first written to a VM memory area allocated to the VM and accessible to the hypervisor hosting the VM;
    wherein a second para-virtualized file system (PVFS BE) supported in the hypervisor asynchronously scans the VM memory to determine if any data that has been stored in the VM memory is to be written to the storage device, wherein the asynchronous scanning is performed based on determining one or both of: that a certain amount of data has been written the VM memory by the PVFS FE after a certain point in time; or that PVFS FE has written data to the VM memory a certain number of times after a certain point in time; and wherein the PVFS BE writes the data that is to be written to the storage device from VM memory to the storage device.

5. The system of claim 4, wherein the PVFS BE marks the data in VM memory that is copied to the storage device to indicate that said data has been written to storage device.

6. The system of claim 4, wherein the asynchronous scanning is performed in predetermined time intervals based on the expiration of a timing threshold.

7. A computer program product comprising a non-transitory computer readable storage medium having a computer readable program, wherein the computer readable program when executed on a computer causes the computer to:
monitor write operations issued by an application running on a virtual machine's (VM) operating system, wherein the VM is hosted by a hypervisor providing access to a storage device in a virtualized computing environment; and
cause a virtual file system (VFS) supported by the operating system to call on a first para-virtualized file system (PVFS FE) supported by the operating system to execute a write operation, in response to determining that the write operation is to write data to the storage device, wherein data that is to be written to the storage device is first written to a VM memory area allocated to the VM and accessible to the hypervisor hosting the VM;
wherein a second para-virtualized file system (PVFS BE) supported in the hypervisor asynchronously scans the VM memory to determine if any data that has been stored in the VM memory is to be written to the storage device, wherein the asynchronous scanning is performed based on determining one or both of: that a certain amount of data has been written the VM memory by the PVFS FE after a certain point in time; or that PVFS FE has written data to the VM memory a certain number of times after a certain point in time; and
wherein the PVFS BE writes the data that is to be written to the storage device from VM memory to the storage device.

8. The computer program product of claim 7, wherein the PVFS BE marks the data in VM memory that is copied to the storage device to indicate that said data has been written to the storage device.

9. The computer program product of claim 7, wherein the asynchronous scanning is performed in predetermined time intervals based on the expiration of a timing threshold.

* * * * *